United States Patent [19]

Ukaji et al.

[11] Patent Number: 4,859,824
[45] Date of Patent: Aug. 22, 1989

[54] ELECTROSPARK MACHINE SYSTEM, ASSEMBLY FOR USE WITH SYSTEM, DEVICE FOR MOUNTING ELECTROSPARK MACHINING ELECTRODE, AND METHOD OF SHAPING A WORKPIECE

[75] Inventors: Shiroh Ukaji; Hisao Kimura; Kenji Urata; Toshio Kaneda, all of Tokyo, Japan

[73] Assignee: Asahi Kogaku Kogyo Kabushiki Kaisha, Tokyo, Japan

[21] Appl. No.: 103,726

[22] Filed: Oct. 2, 1987

[30] Foreign Application Priority Data

| Oct. 3, 1986 | [JP] | Japan | 61-235588 |
| Oct. 3, 1986 | [JP] | Japan | 61-235589 |
| Oct. 3, 1986 | [JP] | Japan | 61-235590 |
| Feb. 19, 1987 | [JP] | Japan | 62-234454[U] |

[51] Int. Cl.$^4$ .............................. B23H 7/22
[52] U.S. Cl. .................. 219/69.15; 29/418; 29/558; 29/825
[58] Field of Search ............... 29/825, 874, 557, 558, 29/418; 219/69 R, 69 E, 69 V, 69 M; 51/5 D, 165.87, 165.88; 409/63, 80, 132, 148, 187; 204/224 M, 280

[56] References Cited

U.S. PATENT DOCUMENTS

| Re. 27,588 | 2/1973 | Hauserman | 219/69 V |
| 3,479,479 | 11/1969 | O'Connor | 219/69 V |
| 4,005,635 | 2/1977 | Feldcamp | 409/132 |
| 4,449,027 | 5/1984 | Furukawa | 219/69 E |
| 4,596,066 | 6/1986 | Inoue | 219/69 M |
| 4,626,645 | 12/1986 | Inoue et al. | 219/69 W |
| 4,725,704 | 2/1988 | Vuichard | 219/69 R |

FOREIGN PATENT DOCUMENTS

| 0145138 | 6/1985 | European Pat. Off. |
| 3003756 | 8/1980 | Fed. Rep. of Germany |
| 3005639 | 8/1981 | Fed. Rep. of Germany |
| 61-76218 | 4/1986 | Japan | 219/69 E |

OTHER PUBLICATIONS

"System 3R Linking Conventional and Wire EDM" by Sebzda, pp. 16,17,20–26 of 08/1983 *EDM Digest*.

*Primary Examiner*—A. D. Pellinen
*Assistant Examiner*—Geoffrey S. Evans
*Attorney, Agent, or Firm*—Sandler & Greenblum

[57] ABSTRACT

An electrospark machining system which includes an electrode forming machine which machines an electrode blank into a shaped electrode having a desired profile, an electrospark machine to which the shaped electrode is attached in order to machine a workpiece, and a reference block which is adapted to be attached to the electrode blank and which has a reference surface which can be commonly attached to the electrode forming machine and to the electrospark machine. A method of shaping a workpiece using this system is also provided.

82 Claims, 12 Drawing Sheets

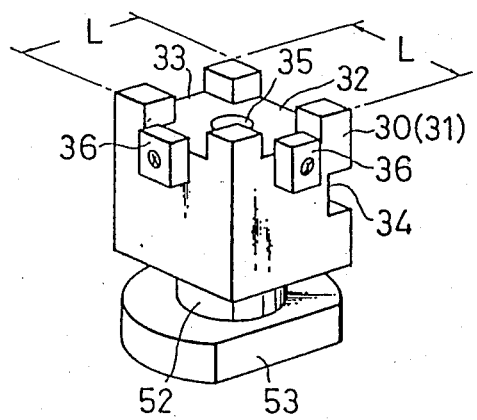
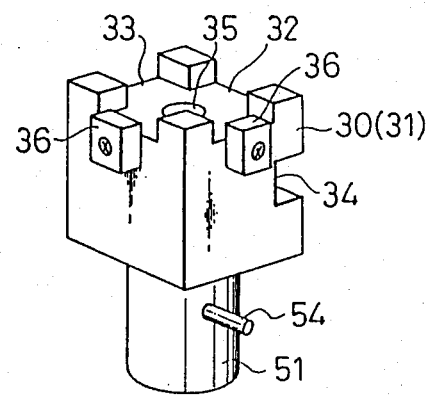
Fig. 3A    Fig. 3B
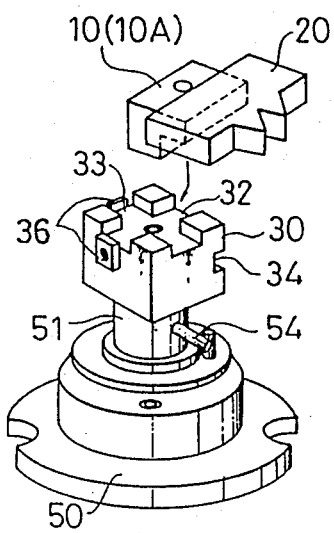
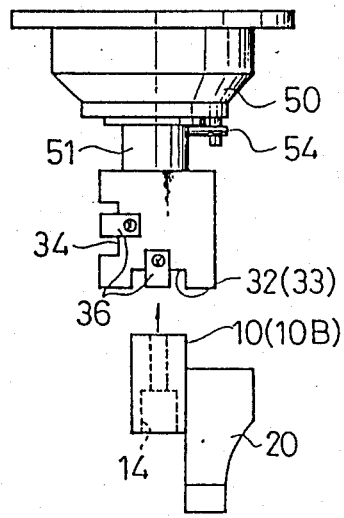
Fig. 4A    Fig. 4B

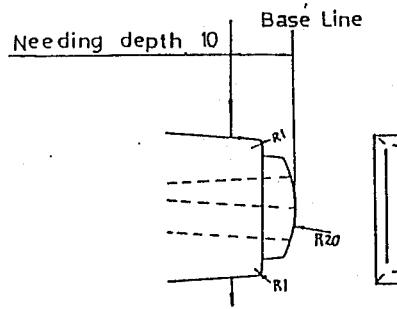
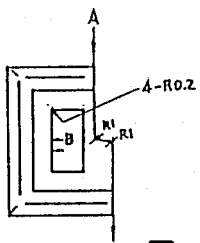
Fig. 5B    Fig. 5A
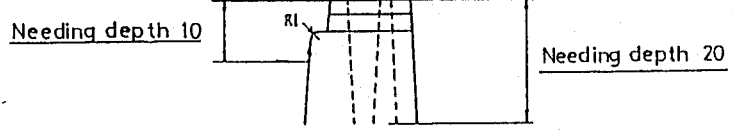
Fig. 5C
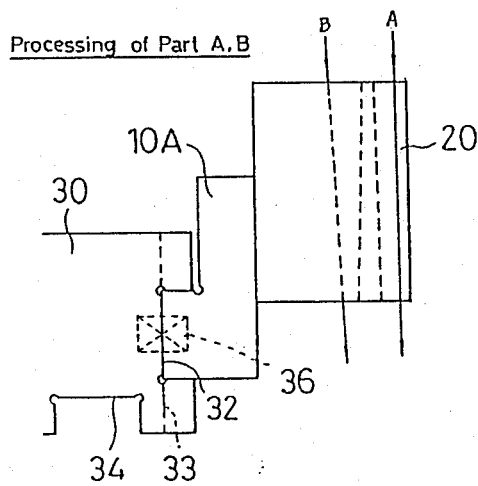
Fig. 6A
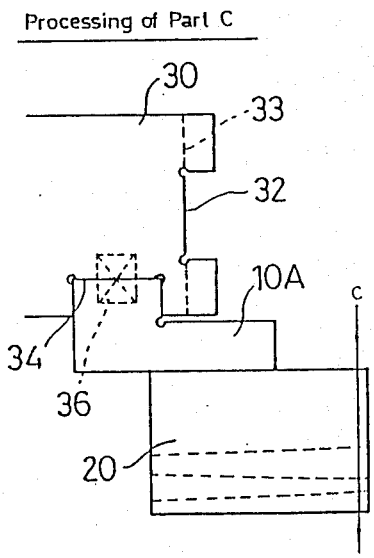
Fig. 6C
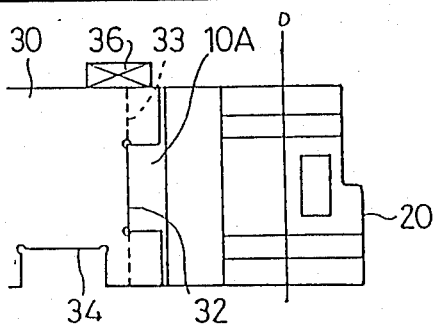
Fig. 6B

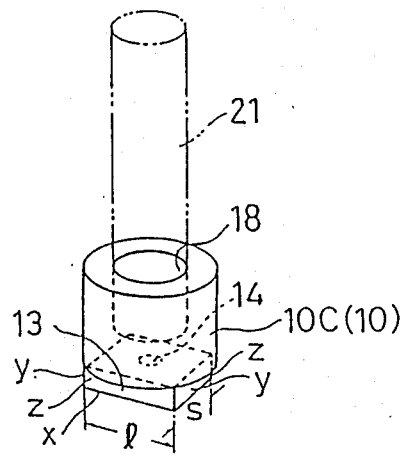
Fig. 7
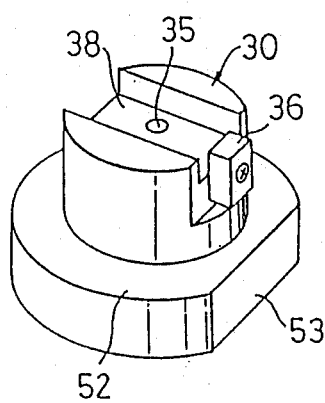 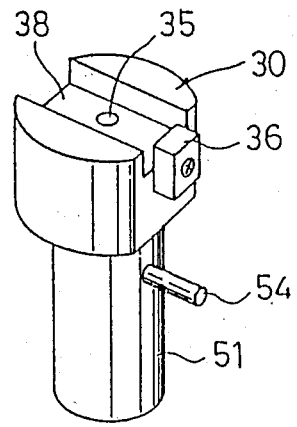
Fig. 8A    Fig. 8B

ELECTROSPARK MACHINE SYSTEM, ASSEMBLY FOR USE WITH SYSTEM, DEVICE FOR MOUNTING ELECTROSPARK MACHINING ELECTRODE, AND METHOD OF SHAPING A WORKPIECE

BACKGROUND OF THE DISCLOSURE

1. Technical Field of the Invention

The present invention generally relates to an electrospark machining system, a device for mounting an electrospark machining electrode, and a method of using an electrospark machining system, and more specifically to a system which eliminates the need for using a surface of an electrode blank as a reference surface when an electrode blank is formed into a shaped electrode and during the electrospark machining of a workpiece using the thus-shaped electrode.

2. Description of Relevant Information

Electrospark machines and electrodischarge machines (also known as EDM machines) are presently widely used, e.g., to manufacture high precision molding dies for injection molding machines; these electrospark machines are used because of their high machining efficiency. In these systems, the shape of a shaped electrode is accurately reproduced on a workpiece to be machined. Generally, a blank from which the electrode is formed is machined by a wire cut electric spark machine, a cutting machine, or other machine tool, in order to provide a shaped electrode having a desired shape.

A molding die having a simple profile can be machined, e.g., by a single shaped electrode. However, a molding die having a complex profile cannot be machined by only a single, shaped electrode. Specifically, such a complex molding die can instead only be machined by a composite machining system, using a plurality of shaped electrodes.

Generally speaking, the number of shaped electrodes used in a composite machining process can be reduced or decreased if shaped electrodes having three-dimensional complex profiles could be produced and used. However, in practice, an increased plurality of shaped electrodes are needed to produce shaped electrodes having complex three-dimensional profiles, thereby resulting in an apparatus which would be difficult to maintain.

During the conventional machining process of a shaped electrode, six faces of a rectangular parallelepipedic electrode blank are ground in order to provide six reference surfaces which are perpendicular to each other. The electrode blanks can be attached to an electrode forming machine, e.g., a wire cut electric spark (hereinafter electrospark) machine, with the assistance of the reference surfaces on the blank. When the electrode blank is subjected to a two- or three-dimensional machining process, the reference surfaces must be changed in order to again attach the blank to the electrode forming machine.

In such a conventional machining process, as noted above, it is necessary to adjust the mounting position of the electrode blank, including but not being limited to centering the blank, and/or creating parallelism or perpendicularity between the reference surface or surfaces and the surface being machined at each change of direction during the machining process. The operations needed to make such adjustments are difficult and troublesome. Accordingly, it is practically impossible to obtain a shaped electrode having a three-dimensional complex profile using conventional methods. Accordingly, during an actual machining process, the molding dies are machined by a composite machining device in which a large number of shaped electrodes having simple profiles are used.

The above-noted problems also occur during a machining process using an electrospark machine having a shaped electrode attached thereto. Specifically, when the shaped electrode is transferred from the electrode forming machine to the electrospark machine, unless the positional relationship of the electrode with respect to the electrode forming machine is exactly reproduced between the electrode and the electrospark machine, precise and exact machining by the electrospark machine cannot be achieved. In conventional processes, it is extremely difficult to exactly reproduce the identical positional relationship that the electrode had with respect to the electro forming machine when the electrode is positioned in the electrode spark machine; accordingly, the troublesome and difficult adjusting operations as noted above, e.g., the centering operation, must be effected after the electrode is transferred to the electrospark machine. Further, even after such an adjustment is made, an accurate reproduction of the positional relationship between the electrode and the electrode forming machine, on the electrospark machine, cannot be ensured.

One type of shaped electrode is used in which the direction of displacement of the electrode during the course of electrospark machining of a workpiece is perpendicular to the direction of machining of the electrode blank. Using this type of shaped electrode, in conventional processes, the shaped electrode is first machined by the electrode forming machine and removed from the electrode forming machine. Thereafter, the shaped electrode is attached to the electrospark machine after the direction of the electrode is changed by 90°. It is, however, difficult to accurately set the electrode again in the electrospark machine. The failure to accurately position the electrode in the electrospark machine results in a failure to accurately reproduce the shape of the shaped electrode on a workpiece being shaped.

SUMMARY OF THE INVENTION

Accordingly, one primary object of the present invention is to provide a system for machining an electrode in which a blank of an electrode can be machined into a shaped electrode having a predetermined shape without using any reference surface on the electrode blank itself.

Another object of the present invention is to provide an electrospark machining system in which, when the workpiece is machined by a shaped electrode during an electrospark machining method, the direction of electrospark machining can be easily controlled in order to correspond to the direction of machining of the blank of an electrode into the shaped electrode.

Still another object of the present invention is to provide a mounting for an electrode which can be advantageously used, particularly when the direction of machining of the electrode blank into a shaped electrode is perpendicular to the direction of electrospark machining of a workpiece using the shaped electrode obtained when the electrode blank was machined.

Unlike conventional electrode forming methods, in which it is necessary to provide and use one or more reference surfaces on the electrode blank itself in order to mount the electrode blank to an electrode forming machine with the assistance of such reference surface or surfaces, the present invention includes the novel idea of using a separate reference block having three reference surfaces which are normal or perpendicular to each other. Specifically, in the present invention, a separate reference block is mounted to the electrode blank so that the electrode blank can be attached to an electrode forming machine and to an electrospark machine by using the reference surfaces of the reference block. In its simplest form, e.g., the reference block comprises a rectangular block having three reference surfaces which are normal to each other. Preferably, holders which are attached to the electrode forming machine, e.g., a wire cut electrospark machine used to form an electrode, and to the electrospark machine for machining a workpiece (with the use of a shaped electrode thus produced by the electrode forming machine), include reference grooves which can be engaged by reference surfaces of the reference block in order to hold the reference block in a predetermined position on the machines.

With such an arrangement, in accordance with the present invention, the three-dimensional positions of an electrode can be definitely and precisely determined by a reference block having three reference surfaces which are normal to each other; and, accordingly, it is possible to machine an electrode having a complex three-dimensional profile. Such an electrode can be formed without any need for performing any adjusting operation, e.g., there is no need to adjust for surface parallelism, perpendicularity or for centering. Such an adjusting operation would otherwise (normally) need to be performed when the direction of machining of the electrode is changed by the electrode forming machine. As a result, no positional adjustments are necessary in accordance with the present invention, either when electrode machining operations occur in different directions, or when the electrode is positioned in an electrospark machine.

Further, because no centering operations need be performed during a complex machining operation in which a plurality of shaped electrodes are used, molding dies having complex profiles can be machined with high precision, thereby resulting in the increased applicability of the electrospark machining system and method.

Further, in accordance with the present invention, because three-dimensional machining of an electrode can be effected, the number of shaped electrodes needed to produce a large number of identical molding dies can be decreased, thereby resulting in decreased costs for maintaining the shaped electrodes.

The reference block which is used can be, e.g., a rectangular block; and holders used in the machinery can have reference grooves which are complementary in shape to the shape of the reference block. As one example, both the holder groove, and the block itself, can be substantially V-shaped.

The present invention can also be advantageously used when the direction of machining of the electrode blank in the electrode forming machine is changed; and the later direction of machining of a workpiece generally corresponds to the direction of displacement of the shaped electrode. Accordingly, a mounting device according to the present invention is provided which includes a machine holder which can be detachably connected to the electrode forming machine and to the electrospark machine which machines the workpiece by using the shaped electrode obtained by the electrode forming machine. The machine holder is adapted to be engaged by an electrode holder which holds the electrode blank, with rotational surfaces being provided on both the electrode forming machine holder and the electrospark machine holder, which surfaces are inclined at 45° with respect to the axis of the machine holder. Relative rotation of the machine holder with respect to the electrode holder over the rotational surfaces, by 180°, causes the position of the electrode blank which is secured to the electrode holder to be changed by 90° with respect to the machine holder. In accordance with the mounting device referred to above, only rotation of the electrode holder by 180° with respect to the machine holder will be sufficient to orient the electrode blank, (i.e., the shaped electrode) to agree with the direction of electrospark machining after the electrode blank is machined into the shaped electrode by the electrode forming machine.

In a first aspect thereof, the present invention provides an electrospark machining system including an electrode forming machine comprising means for machining an electrode blank in order to produce a shaped electrode having a predetermined profile, an electrospark machine to which the shaped electrode is adapted to be attached in order to machine a workpiece and a reference block having a plurality of surfaces, the reference block being adapted to be attached to the electrode blank and having at least one surface which serves as a common reference surface for the electrode forming machine and the electrospark machine.

The system further comprises at least one holder which is detachably connected to the electrode forming machine and at least one holder which is detachably connected to the electrospark machine, the holders having mounting surfaces which are adapted to detachably engage the reference surface of the reference block in order to retain the reference block in a predetermined position within the machines.

The reference block includes a parallelepipedic insertion section having three reference surfaces which are perpendicular to each other, each of the electrode forming machine holder and the electrospark machine holder comprising means for engaging the three surfaces of the insertion portion of the reference block and means for supporting the reference block in a predetermined position in the machines.

Each of the holders includes at least two planar surfaces which are perpendicular to each other, one of the planar surfaces being provided with two intersecting grooves and the other of the planar surfaces including at least one groove.

The intersecting grooves of the forming machine holder comprise means for detachably engaging the reference block insertion portion, and the at least one groove comprises means for detachably engaging an electrode forming tool.

The system can also include an electrode forming tool attached to a work table of the electrospark machine, the electrospark machine holder being adjustably supported on the electrode forming tool. The electrospark machine holder includes a substantially vertical guide rail which is slidably engaged by the at least one groove. Each of the holders includes a shaft for respectively mounting the holders to the electrode forming machine and to the electrospark machine.

The shafts are substantially cylindrical, and each includes an outwardly extending, rotation restricting pin thereon. The reference block includes a reference insertion portion having three reference surfaces which are normal to each other, each of the holders including at least one reference groove which is adapted to be selectively engaged with a reference surface on the reference block to thereby comprise means for supporting the reference block in a predetermined position on the holder.

Each of the holders includes an integrally attached mounting shaft which comprises means for mounting the holders on the electrode forming machine and on the electrospark machine, respectively; and each of the holder reference grooves is substantially perpendicular to the mounting shaft.

Each of the holders includes a reference surface which comprises means for mounting the holders, respectively, to the electrode forming machine and to the electrospark machine; the holder reference surfaces are alternately spaced from, and attached to, the at least one reference groove, by a connecting shaft portion.

The reference block and each of the holders can includes a plurality of positioning holes and a plurality of positioning pins adapted to be inserted into the positioning holes in order to secure the reference block to the holders. The reference block can include the positioning holes, and the holders include the positioning pins; or the reference block can include the positioning pins and the holders the positioning holes.

Each of the holders includes a mounting shaft integrally attached thereto which comprises a reference surface for mounting respective holders to the electrode forming machine and to the electrospark machine.

The holders include reference grooves which are perpendicular to the mounting shaft, and the holders can include a mounting surface which comprises a reference surface for mounting the holders to both the electrode forming machine and to the electrospark machine.

The reference block includes a reference insertion portion having three reference surfaces which are substantially normal to each other, and a blank securing portion adapted to be attached to the electrode blank, the electrode blank securing portion being normal to the reference insertion portion, the reference block thereby being substantially L-shaped.

The reference block includes a reference insertion portion having three reference surfaces which are substantially normal to each other, and a blank securing portion adapted to be secured to the electrode blank, the blank securing portion lying in the same plane as the reference insertion portion, wherein the reference block is substantially I-shaped.

The electrode forming machine itself can comprise a wire cut electrospark machine.

An assembly is provided which includes a reference block having three reference surfaces which are substantially normal to each other, the reference surfaces comprising position references during the shaping of an electrode blank, the reference block being adapted to be attached to the electrode blank, the assembly further comprising a holder which is adapted to be attached to an electrode forming machine, the holder including a mounting surface for mounting and for retaining the reference block in a predetermined position.

The reference block is connected to the electrode blank, and includes a reference insertion portion, the reference insertion portion including three reference surfaces which are substantially normal to each other, the holder including at least one reference groove which is adapted to engage the reference surfaces, the groove thereby comprising means for retaining the reference block in the predetermined position.

The electrode forming machine holder includes three reference grooves which are substantially normal to each other.

Two of the grooves are normal to each other within a common plane, and a third of the grooves is located in a plane perpendicular to the common plane.

The electrode forming machine comprises a wire cut electrospark machine, and the electrode forming machine holder is adjustably attached to a work table of the wire cut electrospark machine.

The holder includes two planar surfaces, substantially normal to each other, one of the planar surfaces including two reference grooves which intersect each other, and the other of the planar surfaces including a single reference groove.

The holder includes a mounting shaft which comprises a reference surface for mounting the reference block to the electrode forming machine, or the holder includes a mounting surface for mounting the reference block to the electrode forming machine.

The holder includes a single reference groove, and the holder is attached to a mounting shaft, the shaft comprising a reference for mounting the holder to the electrode forming machine.

The holder reference groove is substantially perpendicular to the mounting shaft, and the holder is secured to a mounting support, the mounting support having a reference surface which comprises a reference for mounting the holder to the electrode forming machine.

The reference block includes a reference insertion portion which has three reference surfaces substantially normal to each other, and an electrode blank securing portion which is substantially perpendicular to the inserting portion, the reference block being thereby substantially L-shaped.

The reference block includes a reference insertion portion having three reference surfaces substantially normal to each other and an electrode blank securing portion which is positioned in the same plane as the reference insertion portion, the reference block thereby being substantially I-shaped.

The reference block and the holder include a plurality of cooperating positioning holes and pins which are adapted to attach the reference block to the holder.

The holder is attached to an electrode forming machine, and the holder includes a reference groove which is substantially perpendicular to a mounting shaft on which the holder is mounted.

The holder is attached to a mounting member having a reference surface which comprises a reference for mounting the holder to the electrode forming machine.

In yet another aspect, the present invention provides an electrospark machine. This machine uses a mounting device which comprises an electrode holder which is adapted to support an electrode blank to be machined. A machine holder is adapted to be detachably mounted, both to an electrode forming machine for machining the electrode blank into a shaped blank having a desired shape and to an electrospark machine which is adapted to use the shaped electrode to machine a workpiece, wherein the electrode holder and the machine holder include inclined surfaces which are inclined at a substantially 45° angle with respect to an axis of the machine holder, wherein the holders are adapted to engage each other along the surfaces, the inclined surfaces being moveable with respect to each other and thereby comprising means for changing the direction in which the electrode blank extends.

The inclined surfaces are rotatable with respect to each other and comprise means for changing the direction in which the electrode blank extends by 90° when they are rotated over 180° with respect to each other. The electrode holder and the machine holder are detachably connected to each other. The inclined surfaces are electrode-direction changing, rotational surfaces which are adapted to rotate about an axis inclined at an angle of substantially 45° with respect to the axis of the machine holder.

The surfaces have central holes, along their respective axes of rotation, into which a central pin is adapted to be inserted in order to define a common axis about which relative rotation of the holders will occur, the central pin including a central bore into which a fastening bolt is adapted to be inserted in order to secure the holders to each other.

At least one of the machine holder and the electrode holder is provided with a positioning plate which is adapted to project towards the holder to which the plate is not attached, the other of the holders being provided with a pair of parallel position restricting surfaces which are adapted to engage the positioning plate when the electrode holder and the machine holder are angularly displaced, from a first position, by 180° with respect to each other.

A positioning pin is positioned between the electrode holder and the machine holder which comprises means for selectively restricting angular movement between the holders.

The machine holder and the electrode holder include at least one position restricting projection and at least one position restricting recess adapted to receive the projection in fitting engagement, the projection and the recess being positioned on the inclined surfaces such that they intersect an axis of the machine holder.

The position restricting projection and the position restricting recess can be rectangularly shaped in cross-section, or the position restricting projection and the position restricting recess can have complementary V-shaped cross-sections.

One of the holders includes a positioning plate which projects towards the other of the holders, the other of the holders including a pair of parallel position restricting surfaces which are adapted to engage the positioning plate, dependent upon the relative rotational positions of the two holders.

One of the inclined surfaces includes two spaced apart bores and the other of the inclined surfaces includes a single bore, wherein the single bore is adapted to be selectively aligned with each of the spaced apart bores in predetermined positions of the holders, and wherein a fastening member is adapted to be inserted into the aligned bores.

The mounting device includes an electrode holder which is adapted to support a blank of an electrode to be machined, and a machine holder which is adapted to be attached both to an electrode forming machine which is adapted to machine the blank into a shaped electrode having a predetermined shape and to an electrospark machine which is adapted to use the shaped electrode to machine a workpiece, the electrode holder and the machine holder including surfaces which are inclined at 45° with respect to the axis of the machine holder and which are adapted to engage each other, the inclined surfaces comprising means for changing the position of the electrode blank by approximately 90° when the surfaces are repositioned with respect to each other over approximately 180°, wherein one of the holders is provided with a positioning plate which is adapted to be selectively projected towards and retracted from the other of the holders, wherein the other of the holders includes a pair of parallel position restricting surfaces which are adapted to engage the positioning plate when it is projected towards the other holder.

The inclined surfaces are repositioned by rotation and thereby rotatably engage each other and are rotatably repositioned with respect to each other.

The electrode holder includes a pair of electrode securing surfaces which are perpendicular to each other and which are angled at substantially 45° with respect to the inclined surface of the electrode holder; and the electrode securing surfaces of the electrode holder include a plurality of threaded holes which are adapted to threadably receive a plurality of fastening bolts.

In another aspect, the present invention discloses a method of shaping a workpiece in a predetermined configuration by using an electrospark machining electrode. The method comprises mounting an electrode blank to be shaped onto a block having a reference surface, attaching the block reference surface to an electrode forming machine, shaping the blank into a predetermined shape by using the electrode forming machine, detaching the block and blank from the electrode forming machine and attaching the block reference surface to an electrospark machine, and shaping a workpiece by using the electrospark machine to which the blank has been attached.

The method further comprises attaching the block reference surface to a holder on the electrode forming machine and to a holder on the electrospark machine. The reference surface is attached in the same positional relationship to each of the holders.

In another aspect, the present invention provides a holder which is adapted to be detachably connected to both an electrode forming machine and to an electrospark machine, the holder comprising a substantially parallelepipedic block, the block comprising four side surfaces, an upper surface, and a lower surface, wherein four corner projections extend upwardly from the upper surface, each of the corner projections being spaced from two adjacent corner projections, wherein a plurality of substantially perpendicular grooves are formed between the spaced corner projections, one of the side surfaces including a channel which is adapted to be attached to an electrode forming machine.

At least one position limiting member is attached to a side wall of the reference block and extends upwardly beyond the upper surface of the block; and each of the grooves comprises means for detachably receiving a portion of a reference block to which an electrode blank to be shaped is attached.

In still another aspect, the present invention provides an assembly comprising an electrode blank to be shaped and a reference block which is adapted to be attached to the electrode blank, with the assembly being adapted to be attached to either an electrode forming machine or to an electrospark machine. The block has a plurality of bores which are adapted to be aligned with corresponding bores on one surface of the electrode blank, and fastening means adapted to be inserted into the respective bores to connect the reference block to the electrode blank.

The reference block can be substantially parallelepipedic, or can be substantially L-shaped.

The electrode blank can be substantially cylindrical, and the reference block can comprise a hollow tube which includes an opening which is adapted to receive one end of the electrode blank.

The reference block is substantially parallelepipedic and includes a central circular opening which comprises means for receiving a projection on a holder which is adapted to be connected to both an electrode forming machine and to an electrospark machine.

A holder is adapted to detachably engage the assembly; the holder includes means for releasably engaging a reference surface of the reference block. The holder can comprise a plurality of intersecting grooves for releasably engaging the reference block, or can comprise only a single groove for releasably engaging the block.

Alternately, the holder and the reference block include a plurality of aligned bores, with the assembly further comprising a plurality of fastening elements inserted into the bores to attach the holder to the block. A shaft can be attached to the holder, or a mounting member with a reference surface can be attached to the holder.

BRIEF DESCRIPTION OF THE DRAWINGS

The above and other objects, features and advantages of the present invention will be more fully detailed hereinafter with respect to the attached claims and the accompanying drawings, in which like reference numerals are used to describe similar parts throughout the several views, and wherein:

FIGS. 3A and 3B, respectively, are perspective views of two alternate types of holders adapted to be attached to an electrospark machine;

FIGS. 4A and 4B, respectively, are a perspective view and a side elevational view of a shaped electrode including a holder and a reference block connected to the head of an electrospark machine;

FIGS. 5A, 5B and 5C, respectively, are perspective, side elevational, and front elevational views of a shaped electrode which is machined from an electrode blank;

FIGS. 6A, 6B and 6C, respectively, are front elevational views of a reference block illustrated in different mounting positions in order to variously machine the shaped electrode;

FIG. 7 is a perspective view of a reference block formed in accordance with an alternate embodiment of the present invention;

FIGS. 8A and 8B, respectively, are perspective views of two different types of holders which are adapted to be used with the reference blocks illustrated in FIGS. 6A-6C;

DESCRIPTION OF PREFERRED EMBODIMENTS

Figure 1A:
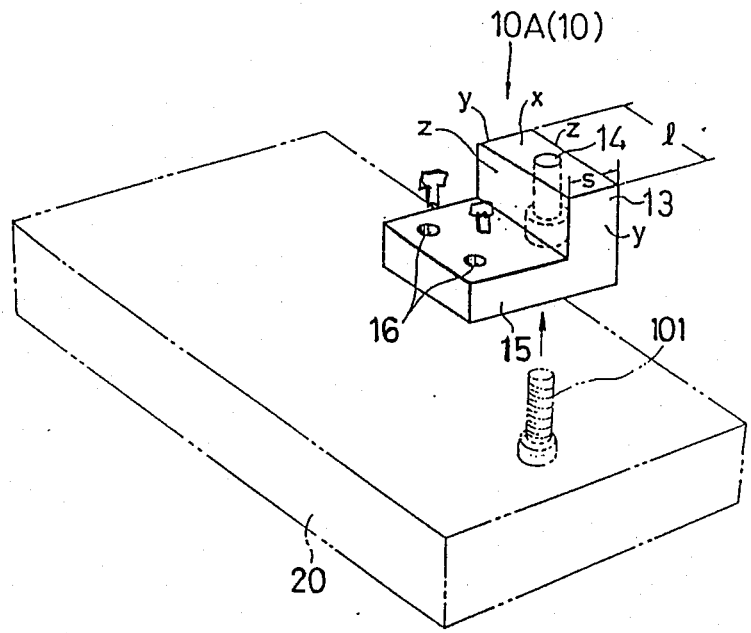
FIGS. 1A and 1B are perspective views of a reference block and an electrode blank formed in accordance with the present invention.
Figure 1B:
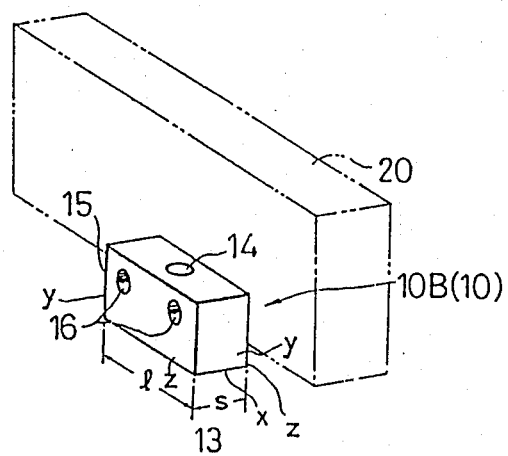

Referring more specifically to the drawings, FIGS. 1A and 1B illustrate a reference block 10 and an electrode blank 20 attached thereto. Normally, different types of electrode blanks 20 in the form of rectangular parallelepipeds are prepared in accordance with the intended shape of the shaped electrode to be formed. In the illustrated embodiments, reference blocks 10A and 10B, of L-shape and I-shape, respectively, are prepared in accordance with the shapes of the portions of the electrode blank which are to be machined. Each of the reference blocks 10A and 10B has at one end a reference insertion portion 13 which includes a butt or end surface (x), a pair of lateral restrictive or defining surfaces (y), which surfaces are spaced a distance (l) from each other, and a pair of longitudinal defining surfaces (z) which are spaced a distance (s) from each other. Surfaces (x), (y) and (z) are reference surfaces which are perpendicular or normal to each other and which are machined and precisely finished, by using a block gauge level, to provide surfaces with a high degree of flatness, and which are accurately and precisely parallel or perpendicular with respect to each other, dependent upon which surfaces are being referred to.

In particular, it is important that widths (l) and (s), and most particularly width (s), be accurately formed.

Figure 2:
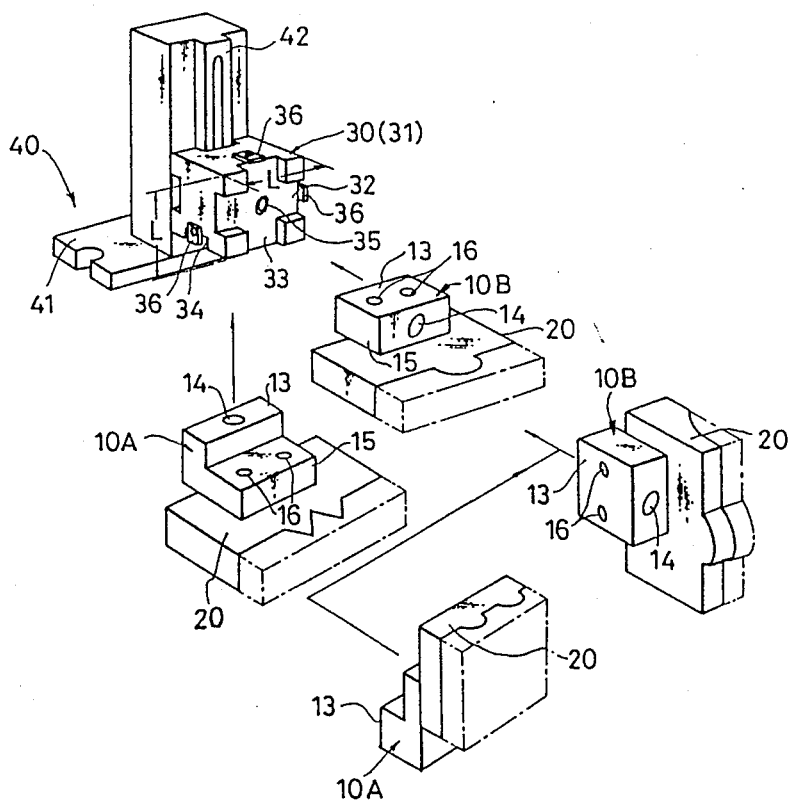
FIG. 2 is an exploded perspective view of a holder, a reference block, and an electrode blank, positioned on an electrode forming machine (e.g., a wire cutting electrospark machine which is used to form and shape an electrode blank)

Reference insertion portion 13 is provided with an insertion hole 14 into which a setting bolt 101 is adapted to be inserted in order to secure the reference block 10 to a holder 30 (see FIG. 2). Insertion hole 14 is provided with a diameter which is slightly larger than that of the setting bolt such that a slight (but secure) clearance is provided between setting bolt 101 and the interior surface of insertion hole 14.

Each of the respective L-shaped and I-shaped reference blocks 10A and 10B is provided with a blank securing portion 15 which is provided with mounting holes 16 to mount on electrode blank 20 (via, e.g., conventional bolts or other fasteners 11). Blank securing portion 15 of L-shaped reference block 10A is perpendicular to the surface insertion portion 13; on the other hand, blank securing portion 15 of I-shaped reference block 10B is connected to reference insertion portion 13 along the same plane.

Mounting holes 16 are provided as either threaded holes or through-holes which are adapted to secure blank 20 to securing portion 15 of reference block 10 via fasteners 11. Electrode blank 20 includes threaded holes (not illustrated) into which conventional setting bolts, e.g. bolts 11, which are also inserted into mounting holes 16 are adapted to be screwed in order to secure a block to the electrode blank.

Holders 30 are prepared for use in an electrode forming device, as illustrated in FIG. 2, and for use in an electrospark machine, as shown in FIGS. 3 and 4. As illustrated in FIG. 2, each holder 30 is adapted for use in an electrode forming tool 40, i.e., in a wire cut electrospark machine which is widely used as an electrode forming device. Electrode forming tool 40 includes a securing or supporting bed 41 which is adapted to be secured to a work table for a wire cut electrospark machine, and a guide rail or rib 42 which is used to (slidably) adjust the vertical position of holder 30. The direction of travel of the wire of the wire cut electrospark machine is either parallel to guide rail 42 or is inclined at a predetermined inclination angle with respect to guide rail 42. Holder 30 includes a plurality of reference grooves 32 which are formed on a plane which is parallel to guide rail 42.

In both FIGS. 3 (3A and 3B) and 4 (4A and 4B), holder 30 is secured to a mounting shaft 51, or to mounting member 52, of electrospark machine head 50. There are two types of heads 50, one of which is a shaft type head in which holder 30 is mounted to shaft 51 of the head, as illustrated in FIG. 3B, and the other type being a surface reference type in which holder 30 is mounted to a mounting member 52 with the assistance of a reference surface 53, as illustrated in FIG. 3A. A rotation restricting pin 54 is provided on shaft 51 in order to restrict the angular displacement of the shaft, and to limit the positional relationships in which the holder can be attached to electrospark machine head 50.

One electrospark machining process, and an electrode forming process, will now be described herein.

Initially, an electrode blank 20 having a profile which corresponds to a desired electrode profile, and either a corresponding L-shaped or I-shaped reference block 10A or 10B, are selected; and mounting holes are formed in the selected electrode blank 20 and the selected reference block 10A or 10B. After these mounting holes are appropriately ground, reference block 10 is secured to electrode blank 20 by setting screws or bolts 11, which are inserted into mounting holes 16, as illustrated in FIGS. 1 and 2. The setting screws or bolts are conventional elements.

Electrode blank 20, having a reference block 10 secured thereto, is then retained or held by holder 30 of electrode forming tool 40, and is subjected to a wire cut electrospark machining process in order to form the electrode blank into a shaped electrode. During a wire cut electrospark machining process, the insertion surface of reference block 10 is fitted into and secured to one of reference grooves 32, 33 or 34 of the holder, such that reference surface (z) of insertion portion 13 of the reference block will come into close surface contact with the side faces of the reference groove to which it is secured, such that reference surface (x) will come into close surface contact with the bottom of the selected reference groove 32, 33 or 34, and such that reference surface (z) will come into close contact with a position restricting member 36 provided on the outer surface of the holder adjacent the grooves, as best illustrated in FIGS. 2-4.

When electrode 20 is machined in one dimensional direction, insertion portion 13 of reference block 10 is fitted into one of the reference grooves 32, 33 or 34 to complete a desired machining process. When electrode 20 is machined in two- or three-dimensional directions, insertion portion 13 is positioned within more than one of the reference grooves 32, 33 and 34 in order to complete a desired machining process.

FIGS. 5A, 5B and 5C illustrate an example of a profile of a shaped electrode to be machined. FIGS. 6A, 6B and 6C illustrate the different mounting positions of reference grooves 32, 33 and 34 of mounting holder 30 when the shaped electrode is machined, as illustrated in FIGS. 5A, 5B and 5C. Arrows A, B, C and D in FIGS. 5 and 6 illustrate the directions of travel of an electrospark machining wire (not shown in the drawings but known in the art).

In accordance with the present invention, therefore, two- or three-dimensional machining can be effected with a high precision, since the positional relationship between electrode blank 20 and reference block 10 is constant and does not change, and because reference block 10 can always be accurately positioned on holder 30 merely by fitting insertion portion 13 of reference block 10 into respective reference grooves 32, 33 and 34 of the holder.

Data representing the position of reference grooves 32, 33 and 34 can be included in machining data which will be input into a computer which controls movement of the wire cut electrospark machine for shaping the electrode blank.

When a tapering machining process is necessary, the direction of travel of the wire will be inclined at a predetermined inclination angle, and the height of holder 30 will be adjusted by sliding the holder along guide rail 42 of electrode forming tool 40, such that data representing the height of holder 30 from the work table of the electrode forming machine will be similarly input to the computer control in order to optionally and accurately set the taper to be imparted to the electrode blank during the shaping process.

The electrode blank which has been machined by the wire cut electrospark machine in order to form a shaped electrode 20 is then subjected to another machining process which need not be effected by the wire cut electrospark machine, e.g., it can be further shaped by a jig borer or by similar machinery if necessary. In such a case, machining data relating to the wire cut machining process can be supplied to the jig borer; it is also possible to measure the shaped electrode at this time.

The machined electrode 20 is then mounted to head 50 of the electrospark machine via holder 30, which is secured to mounting shaft 51 or mounting member 52 without removing reference block 10 from electrode 20, as best illustrated in FIG. 4. Holder 40 is identical to the holder 30 which is used in the electrode forming tool 40 of the wire cut electrospark machine used to shape blank 20, and, accordingly, shaped electrode 20, the machining data from which can be input to the electrospark machine, is then attached to the electrospark machine. Specifically, when insertion portion 13 of reference block 10 is fit within any one of reference grooves 32, 33 or 34 of holder 30, in accordance with a predetermined machining direction of the shaped electrode, and when the setting bolts are screwed within mounting holes 16 and threaded holes 35, the electrode blank being machined will be in the same position as when it was in the wire cut electrospark machine used to shape the blank. When the shaped electrode is then set or attached to the electrospark machine (which positioning will be referred to as a "set change" hereinafter), it will not be necessary to adjust the parallel or perpendicular relationship of the surfaces of the electrode, nor the centering of the electrode, with respect to the holder.

Further, the machining and measurement data, i.e., data representing the actual profile of the shaped electrode, will be supplied to the control unit for the electrospark machine. Electrospark machining is then effected by bringing head 50 of the machine close to the workpiece to be machined, such that the workpiece will be shaped by the electrode so as to have a profile precisely identical to the profile of the shaped electrode 20.

The present invention can be used in a composite machining process in which a plurality of shaped electrodes having different profiles are used. Namely, during such composite machining, it is important to center electrodes 20; and, in accordance with the present invention, centering of a plurality of shaped electrodes can be easily effected in a single operation, without special adjustment.

Further, in accordance with the present invention, because a workpiece having a complex profile can be machined by a single shaped electrode, precise molding dies with complex profiles can be machined by a reduced number of shaped electrodes.

FIGS. 7 and 8 (8A and 8B) disclose an alternate embodiment of a reference block 10C and holder 30', both formed according to the present invention. In this embodiment, the shaped electrode has a simpler profile. Specifically, reference block 10C includes an electrode blank insertion hole or bore 18, which is adapted to receive an electrode blank in the form of a cylindrical rod 21, and a hole 14' into which a setting bolt (not shown) is inserted to attach the block to a holder. Insertion portion 13' of reference block 10C is essentially identical to the insertion portion of the above-described embodiment. Accordingly, elements corresponding to those in the first embodiment have been designated by the same reference numerals of the those in the first embodiment in this second embodiment; with the exception that primes have been added to describe the similar elements in this embodiment.

Holder 30', which is common to both the electrode forming machine and to the electrospark machine, includes a single positioning groove 38 into which insertion portion 13' of reference block 10C is adapted to be inserted. Positioning groove 38 is provided at one end with a position-restricting member 36' attached thereto along the exterior surface of the upper portion of the holder. This member is adapted to sit on or above a seating surface 39, as illustrated in FIG. 8A. In a manner similar to the structure of the first embodiment, two types of holders 30' are provided, a shaft reference type holder in which the holder includes a mounting shaft 51' and a rotation restriction pin 54', and a surface reference type holder in which the holder includes a mounting member 52' with a reference surface 53'. In any event, the positional relationship between mounting shaft 51' or reference surface 53', and positioning groove 38, can be predetermined in advance. Electrode blank 21, which is supported by holder 30' via reference block 10C, is thus adapted to be machined into a predetermined shape by an electrode forming machine, in a fashion similar to that of the first embodiment; thereafter, the shaped electrode thus produced from electrode blank 21 is set into an electrospark machine having an identical holder 30', such that the workpiece to be machined can be machined with a high precision by an electrospark machining process.

Figure 9:
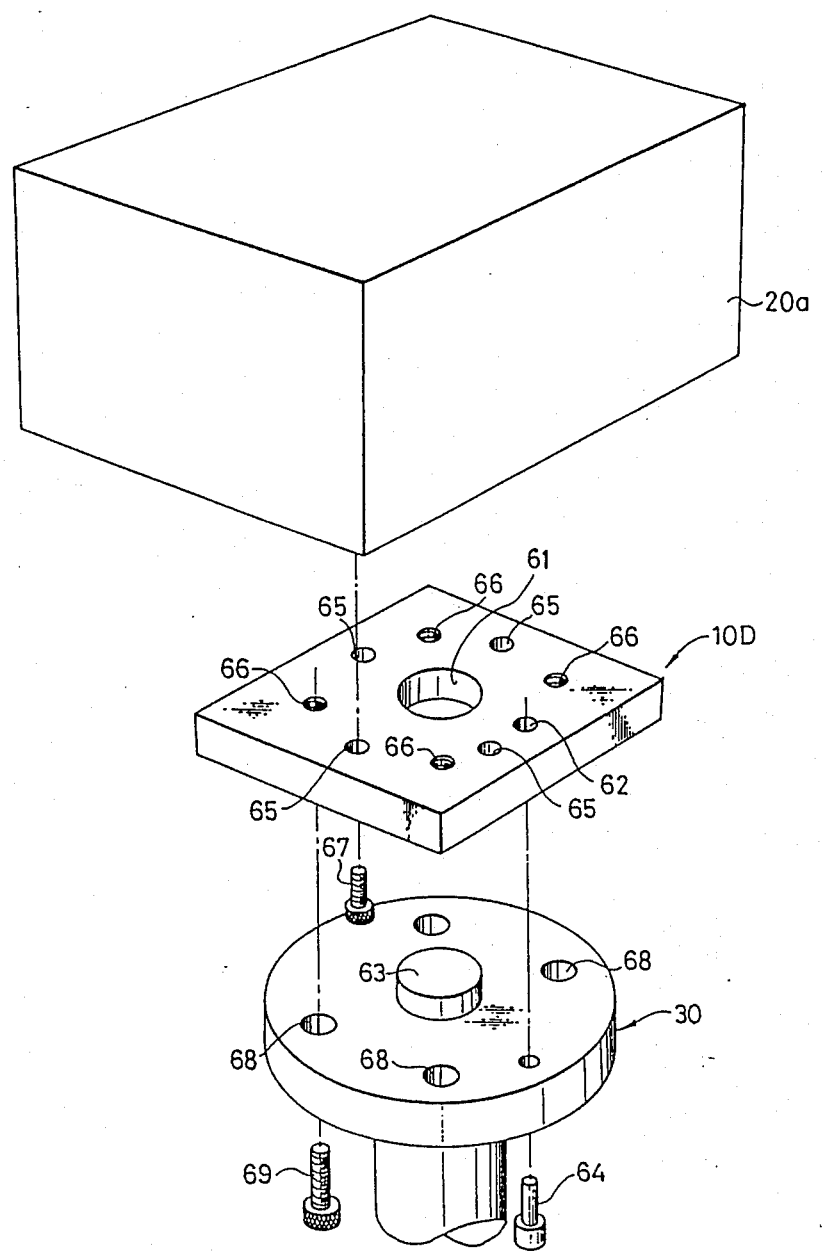
FIG. 9 is an exploded perspective view of another embodiment of a reference block and holder.

A different reference block and holder can be advantageously used for a relatively large electrode blank 20a; in FIG. 9, reference block 10D includes two positioning holes 61 and 62, and holder 30a includes two positioning pins 63 and 64 which can be inserted into respective positioning holes 61 and 62.

Central positioning pin 63 is integrally attached to holder 30a, and circumferential positioning pin 64 can be detachably inserted into a hole in holder 30a which corresponds to positioning hole 62. Alternatively, it is also possible to provide positioning pins on reference block 10D and to provide the corresponding positional or positioning holes on holder 30a, in a manner opposite from (but similar in purpose) to the illustrated embodiment of FIG. 9.

In FIG. 9, reference block 10D includes mounting holes 66 into which set bolts or screws 69 are screwed in order to secure reference block 10D to holder 30a. Set bolts 67, which are inserted into corresponding mounting holes 65, are screw-engaged into corresponding threaded holes (not illustrated) of electrode blank 20a in order to secure block 10D to the electrode blank 20. Set bolts 69 are then inserted into bolt inserting holes 68 of holder 30a in order to secure reference block 10D and electrode blank 20a to holder 30a. There are two possible types of holders, e.g., a shaft reference type of holder and surface reference type of holder, similar to those shown in FIG. 8, although these are not expressly shown in FIG. 9. The holders are adapted to be mounted commonly to an electrode forming machine and an electrospark machine, as noted previously.

Similar to the embodiments illustrated in FIGS. 7 and 8, in the embodiment of FIG. 9, the electrode blank is mounted to the electrode forming machine via a holder, such that the electrode blank will be shaped into a shaped electrode having a predetermined shape; and, thereafter, the shaped electrode is adapted to be mounted to the electrospark machine via a holder which is identical to the holder of the electrode forming machine, where it will be subjected to electrospark machining with a high precision.

In an alternative embodiment of the present invention, it is possible to provide a reference block having a V-shaped cross-section. In this alternative embodiment, the reference groove of the holder is also provided with a V-shape, such that the V-shaped groove will provide two reference surfaces which are substantially perpendicular to each other. Alternately, it is also possible to provide a cross-shaped insertion portion on the reference block and a complementary, cross-shaped reference groove(s) on the holder, in order to facilitate engagement between the holder and the block.

As noted from the above explanation, the present invention is most advantageous when identical holders are provided on both the electrode forming machine and the electrospark machine. Alternately, the present invention can be applied only to an electrode forming machine to produce a shaped electrode having a predetermined shape. In this alternate embodiment, the specific holder which is adapted to be mounted to the electrospark machine need not be considered.

The following discussion will be directed to a mounting for an electrospark machining electrode.

Figures 10A, 10B:
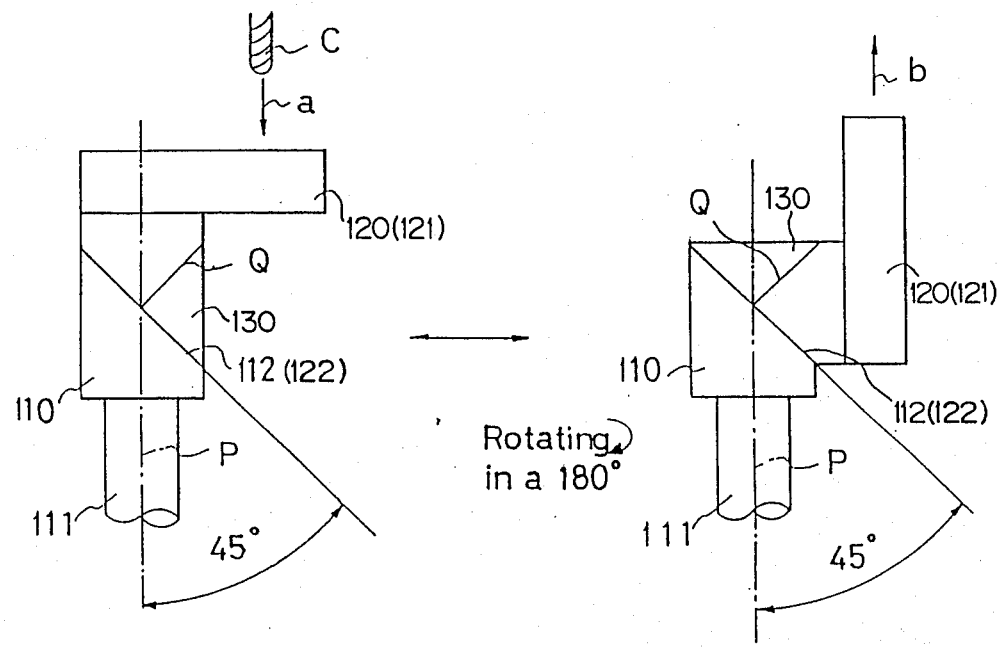
FIGS. 10A and 10B, respectively, are front elevational views of an electrode mounting device illustrated in an electrode machining position and in an electrospark machining position in accordance with the present invention.

FIGS. 10A and 10B illustrate one example of the mounting of an electrode. The electrode mounting device of the invention essentially includes a machine holder 110 which will be hereinafter referenced as a machine holder, and an electrode holder 130. Machine holder 110 is common to all machine tools, such as ball end mill machines and electrospark machines, and is adapted to be detachably mounted thereto. In the illustrated embodiment, machine holder 110 is of the shaft reference type, in which the holder is inserted in the machine by inserting a detachable shaft 111 into an aperture into a machine. The holder can be replaced by a surface reference type of holder, as described above and as shown in the drawings. An electrode blank 120 (and, later, the formed electrode 121) to be machined by a shaped electrode of an electrospark machine is attached to electrode (blank) holder 130. Machine holder 110 and electrode holder 130 engage each other at rotatable, i.e., direction changing, surfaces 112 and 122, as illustrated in FIGS. 10A and 10B; both of these surfaces are inclined at 45° with respect to axis P of machine holder 110. In this fashion, electrode holder 130 will rotate about an axis Q which is precisely perpendicular to inclined surfaces 112 and 122. Electrode blank 120 is thus capable of rotating to change its direction by 90° with respect to axis P, as illustrated in FIG. 10B, when holder 130 has rotated over 180°.

Figures 11A, 11B:
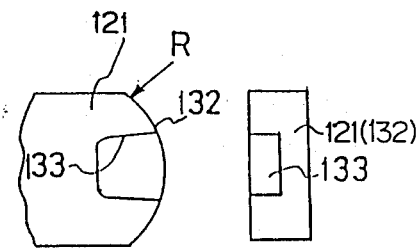
FIGS. 11A and 11B, respectively, are plan and right-side elevational views of a shaped electrode in a situation in which the direction of machining of the electrode is perpendicular to the direction of electrospark machining.

FIGS. 11A and 11B illustrate one example of forming an electrode 121 in which the direction of machining of electrode blank 120 is perpendicular to the direction of electrospark machining. Shaped electrode 121, as illustrated in FIGS. 11A and 11B, thus has a planar body with an arcuate front end 132 and a bottom groove 133 which extends inwardly onto the electrode 121 from the arcuate front end 132 of the electrode.

When a shaped electrode 121 is to be machined, electrode holder 130 is attached to machine holder 110 such that the plane of blank 120 will lie perpendicularly to axis P. After this attachment, a cutting tool C of a machine tool, as illustrated in FIG. 10A, e.g., a ball end mill, will move downwardly as illustrated by arrow (a) in FIG. 10A, and will also move laterally to cut a desired groove 133. It is thus also possible to cut the arcuate front end 132 of the electrode with tool C.

When shaped blank 121 thus obtained is then subjected to electrospark machining by an electrospark machine, electrode holder 130 will be rotated or turned by 180° with respect to machine holder 110, as illustrated in FIG. 10B, such that shaped electrode 121 will be oriented in a direction (b) which is perpendicular to direction (a) of machining effected by tool C. Accordingly, by merely transferring insertion shaft 111 from an electrode forming machine to the electrospark machine, electrospark machining can be precisely and exactly effected. Specifically, since the distance of the axis P of machine holder 110 and the shaped electrodes 121 (i.e., electrode blanks 120) can be predetermined, only rotation of the electrode holder over 180° needs to occur at the time of the "set change" (taking the known distances into consideration) in order to adequately machine a workpiece.

Figure 13:
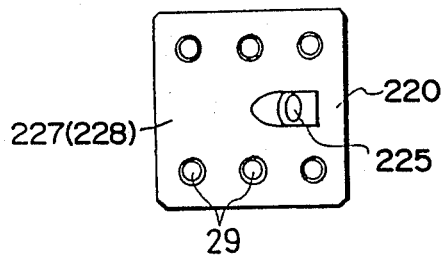
FIG. 13 is a top plan view taken from the direction indicated by the arrow XIII of FIG. 12.
Figure 12:
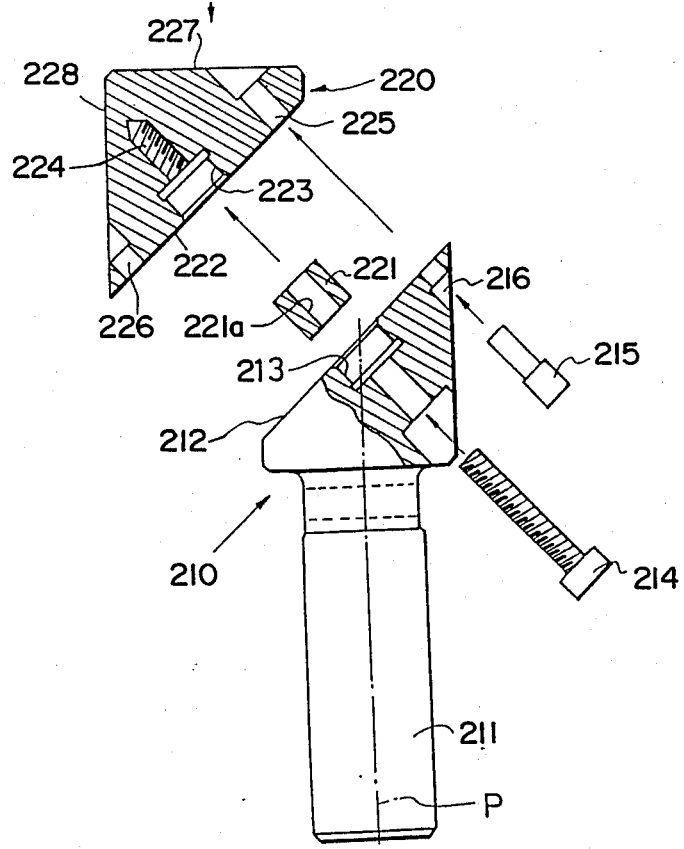
FIG. 12 is a partially sectional and partially front elevational view of an electrode mounting device formed in accordance with the present invention.

FIGS. 12 and 13 illustrate details of a machine holder 210 and an electrode holder 220. Rotational surfaces 212 and 222 are provided with central rotational holes 213 and 223, respectively, into which a central rotational pin 221 is adapted to be inserted, such that holders 210 and 220 can rotate relative to pin 221. Central pin 221 will come into contact at its opposite ends with the bottoms of central holes 213 and 223 in order to restrict or limit the closest distance that machine holder 210 and electrode holder 220 will come to each other. The bottom of central hole 223 is provided with a threaded bore or additional hole 224 into which a fastening bolt 214 is adapted to be inserted through the machine holder side so that it will extend through a central opening 221a in center pin 221. In other words, bolt 214 is screwed into center opening 221a of center pin 221. With such a construction, machine holder 210 and electrode holder 220 can be secured to each other and come into close contact with each other via central pin 223, which also serves to space the holder 220 and holder 210 from each other. Electrode holder 220 includes a pair of positioning holes 225 and 226 which are diametrically opposed to each other with respect to central hole 223; a positioning pin 215 can be selectively inserted into these positioning holes. On the other hand, machine holder 210 includes a positioning hole 216 which is adapted to be selectively aligned with positioning holes 225 and 226 in accordance with rotational movement of the electrode holder 220. As a result, when positioning pin 215 is inserted into positioning hole 216 and one of positioning holes 225 and 226 is registered with positioning hole 216, rotation of the electrode holder 220 relative to the machine holder 210 can be prevented. The two positions in which the positioning pin 215 is inserted in holes 216 and 225 and holes 216 and 226, respectively, correspond to the electrode forming position and the electrospark machining position, respectively, of the holders.

A pair of electrode securing surfaces 227 and 228, which are perpendicular to each other and which are inclined at 45° with respect to rotational surface 222, are provided on electrode holder 220. Electrode securing surfaces 227 and 228 are each provided with threaded holes 229 (see FIG. 13) for receiving set bolts in order to secure an electrode blank as desired. The shaped electrode (i.e., a shaped electrode blank) can be secured to either one of electrode securing surfaces 227 and 228, dependent upon the shape of the shaped electrode. The elements referred to above, specifically surfaces 212 and 222, holes or apertures 213, 216, 223, 225, and 226, centering pin 214, and positioning pin 215, should all be formed in a known fashion such that their surfaces will have a high surface flatness, the holes will have good surface regularity and accurate diameters, and the clearances between the holes and the pins will be relatively small.

With an arrangement as referred to above, when fastening bolt 214 is disengaged from threaded aperture 224, electrode holder 220 can be detached from machine holder 210. Accordingly, by preparing a required plurality of electrode holders 220 having, e.g., electrode blanks 20 (or shaped electrodes 20) secured thereto, the number of machine holders 210 can be decreased (e.g., only one machine holder 210 will be needed) in order to achieve the object of the present invention.

In particular, if a plurality of electrode holders 220 having shaped electrodes are adapted to be detachably mounted to a single machine holder 210, there will be no deviation in the centers of the attached electrodes, as there would otherwise be during composite machining using such electrodes. Further, precise machining results from the use of positioning pin 215, which restricts angular displacement of electrode holder 220.

Figure 14:
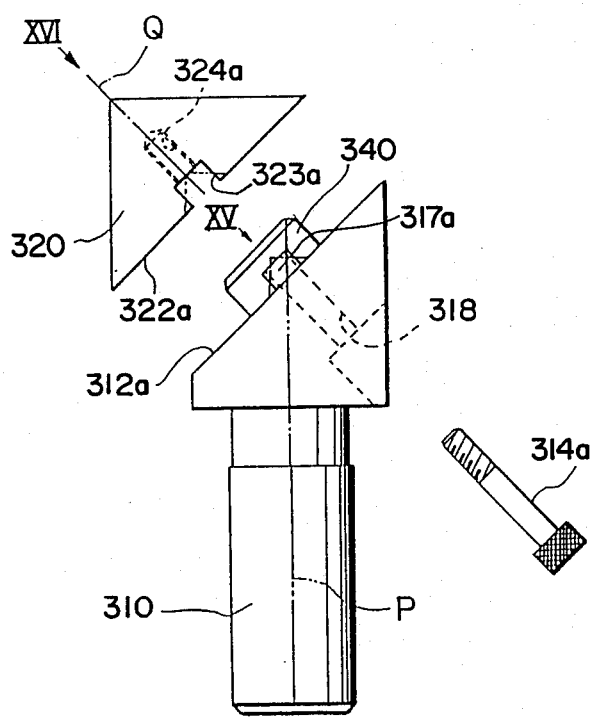
FIG. 14 is an exploded front elevational view of a mounting device for an electrospark machining electrode.
Figure 15:
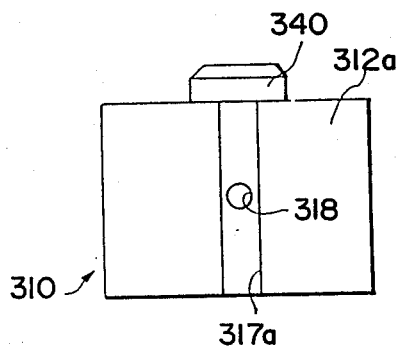
FIGS. 15 and 16, respectively, are angled plan views taken along the arrows XV and XVI, respectively, of FIG. 14.
Figure 16:
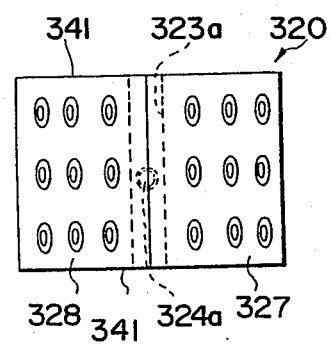
Figure 17:
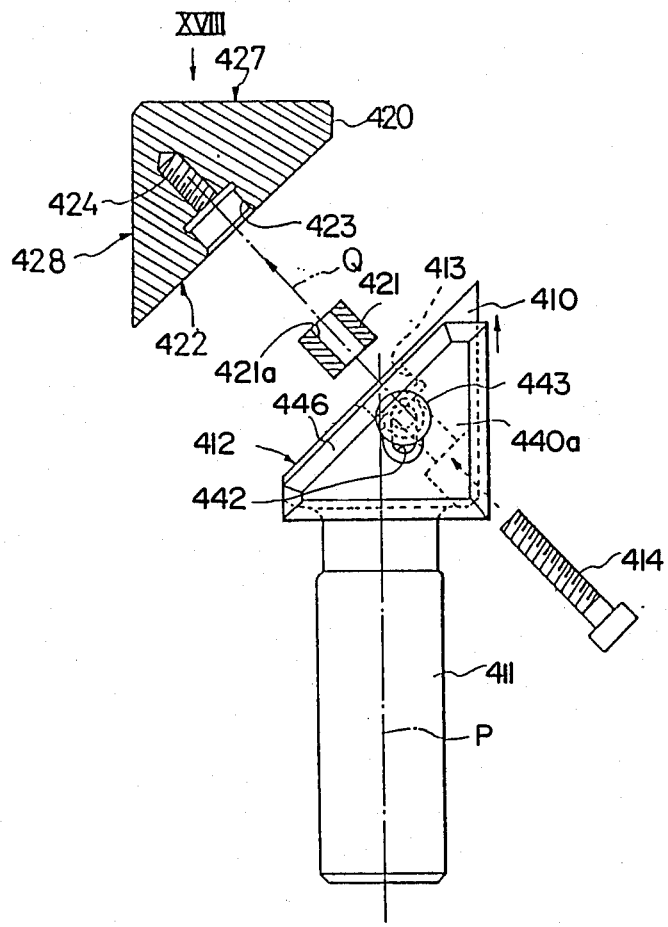
FIG. 17 is a partially cross-sectional, partially front-elevational, exploded view of an electrode mounting device formed in accordance with the present invention.
Figure 18:
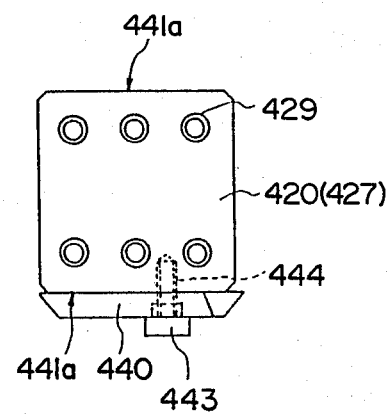
FIG. 18 is a top plan view taken along the arrow XVIII in FIG. 17.
Figure 19:
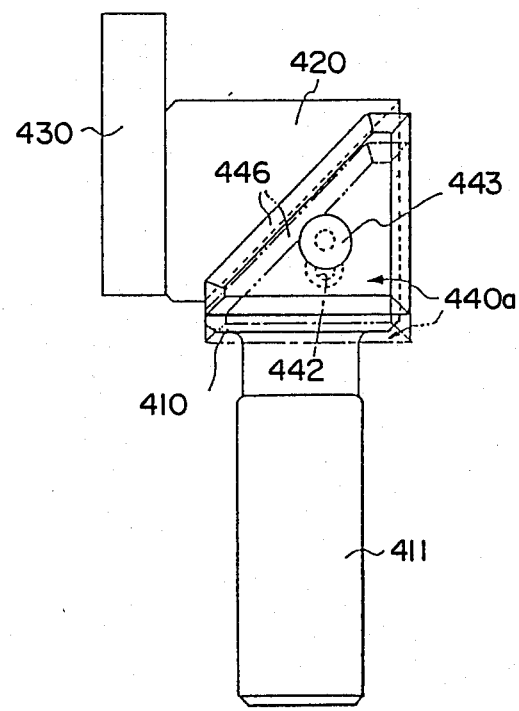
FIG. 19 is a front elevational view of the electrode mounting device of FIG. 17 in assembled form.

In the embodiment referred to above, rotational surfaces 212 and 222 comprise direction changing surfaces. Alternately, it is possible to provide non-rotational direction changing surfaces, as illustrated in FIGS. 14-16. In FIGS. 14-16, machine holder 310 includes a direction changing surface 312a which is provided with an elongated position restricting projection 317a which is located at an intersecting point of the surface with the axis P, as shown in FIG. 14. Projection 317a is in the form of a rod having a substantially rectangular cross-section. On the contrary, electrode holder 320 has a direction changing surface 322a which is provided with an elongated aperture 323a which is in the form of a rectangular groove into which projection 317a is adapted to be fitted.

In this embodiment, machine holder 310 includes a bolt hole 318 substantially at the center of the length of projection 317a, which bolt hole is positioned perpendicularly with respect to the direction changing surface 312a. Electrode holder 320 includes a threaded hole 324a which is located at the center of the length of the bottom of recess 323a of electrode holder 320; and which is connected to machine holder 310.

Fastening bolt 314a is inserted into bolt hole 318 and is threadably screw-engaged in threaded hole 324a of electrode holder 320 in order to secure holders 310 and 320 to each other.

A positioning plate 340 is secured to a side face of machine holder 310; this positioning plate projects towards electrode holder 320. Electrode holder 320 includes a pair of parallel position restricting surfaces 341 which are spaced from threaded hole 324a by the same distance, and which are perpendicular with respect to recess 323a. Position restricting surfaces 341 are positioned so as to engage positioning plate 340; and the mounting device referred to above is adapted to separate machine holder 310 from electrode holder 320 when fastening bolt 314a is disengaged.

Electrode holder 320 includes electrode securement surfaces 327 and 328, as shown in FIG. 16. After the holders are separated from each other, they are relatively rotated or turned by 180°, and projection 317a of machine holder 310 is fitted within recess 323a of electrode holder 320, such that one of position restricting surfaces 341 will come into contact with positioning plate 340. Finally, fastening bolt 314a will be inserted into hole or bore 318 and screwed into threaded hole 324a, again in order to secure electrode holder 320 to machine holder 310, such that the position of an electrode blank (e.g.,20) secured to electrode holder 320 will be reversed, namely rotated over 180°. In the mounting device illustrated in FIGS. 14-16, machine holder 310 and electrode holder 320 can be easily and inexpensively manufactured.

It should be noted that projection 317a and corresponding recess 323a can be provided with a V-shaped configuration in cross-section, as illustrated by the imaginary lines in FIG. 14, rather than a substantially rectangular cross-section. It should therefore be appreciated that the cross-sectional configurations of projection 317a and the recess 323a need not be limited to a rectangular or V-shape, as noted above, but could be formed from other shapes. The projection and the recess can be formed of any complementary configurations which are symmetrical to each other and with respect to central axis of rotation Q.

The position restricting mechanism in which a positioning plate 340 is provided on a machine holder 310, as illustrated in FIG. 14, can also be applied to the first embodiment referred to above if desired.

FIGS. 17-20 illustrate another embodiment of a mounting device having a positioning plate 440a. Positioning plate 440a is provided on machine holder 410 such that the inner face of positioning plate 440a will engage a pair of positional restricting surfaces 441a provided along the side faces of electrode holder 420. Positioning plate 440a is movable so that it can engage and disengage position restricting surfaces 441a.

Specifically, positioning plate 440a includes an elongated bore or hole 442 which extends along the direction of axis P. A fastening screw 443 is inserted into elongated bore 442 and is screwed into threaded hole 444 which is formed in machine holder 410. Accordingly, positioning plate 440a can move over a distance defined by elongated hole 442; the length of the elongated hole extends in the direction of axis P, such that inclined portion 446 of plate 440a, which is parallel to rotational surface 412 of the front end of machine holder 410, will project from rotational surface 412 towards electrode holder 420. Normally, inclined portion 446 is then retracted into rotational surface 412.

A pair of position restricting surfaces 441a of electrode holder 420 are parallel to each other and are spaced from axis of rotation Q and from axis P by the same distance, in a similar fashion to the above-noted embodiments. The other portions of the embodiment noted in FIGS. 17-20 are essentially identical to those of the first embodiment. The elements illustrated in FIGS. 17-20 which correspond to those of the first embodiment have been designated with the same numerals (with the prefix 400) as those of the first embodiment. For example, electrode securing surfaces 427 and 428, electrode bore 424, shaft 411, electrode holder surface 422 and aperture 423, bolt 414, center pin 421, center pin opening 421a, rotational hole 413, and threaded holes 429, are all substantially equivalent to previously described elements having the same last two digits.

With the arrangement illustrated in FIGS. 17-20, when electrode holder 420 is rotated or turned by 180°, positioning plate 440a slides towards electrode holder 420, so that front inclined portion 446 of positioning plate 440a will come into contact with one of the position restricting surfaces 441a along the inner faces of the inclined portion 446. This prevents relative rotation of electrode holder 420 and machine holder 410. The two restricting positions, in which inclined portion 446 of positioning plate 440a comes into contact with restricting surfaces 441a, correspond to the electrode machining position and the electrospark machining position, respectively.

Figure 20A:
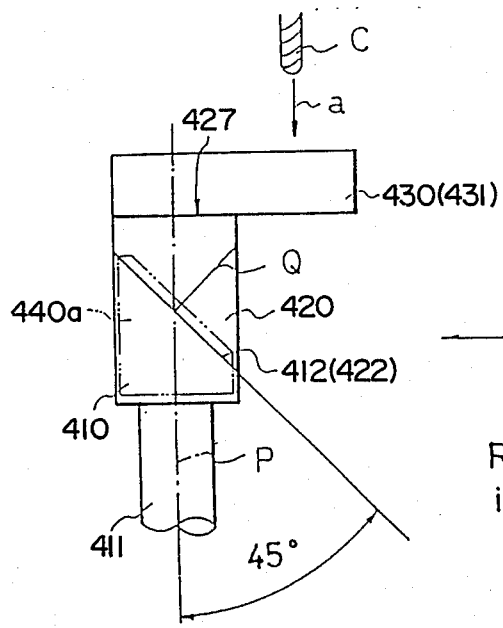
FIGS. 20A and 20B, respectively, are front elevational views of a holder, first in a position for machining an electrode blank, and in an electrospark machining position in which the shaped electrode produced by the electrode forming machine is used.
Figure 20B:
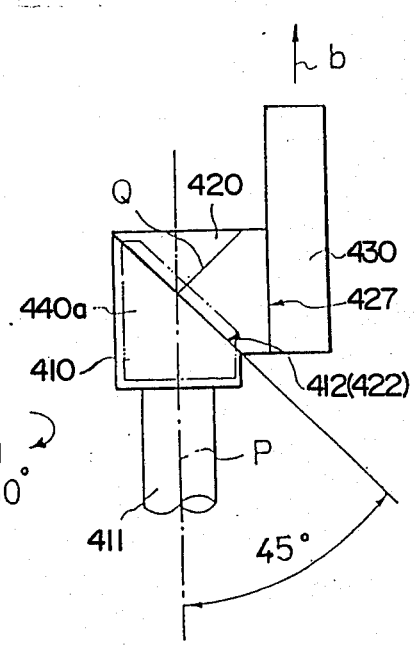

FIG. 20A and 20B illustrate two different positions of an electrode blank 430 (and shaped electrode 431) and substantially correspond to the positions of FIGS. 10A and 10B, respectively.

In the embodiment illustrated in FIGS. 17-20, it is not easy to separate machine holder 410 from electrode holder 420, as compared to the ease of separation which result from use with the previously noted embodiments; and, accordingly, the holders can be treated and handled together, as a unit, thereby resulting in an increased capacity of preventing the holders from becoming lost.

Positioning plate 440a, which is slidable in the illustrated embodiment, can be replaced by a plate which rotates about an axis in order to selectively project and retract a projection from rotating surface 412 of electrode holder 420. Although positioning plates 440 and 440a are provided on machine holder 10 in the illustrated embodiments, they can also be supported on electrode holder 420. In such a case, position restricting surfaces will be provided along machine holder 410.

Although the present invention has been described with respect to a variety of specific embodiments thereof, it should be clear that it is not limited to the specific embodiments listed herein, and that it equally applies to all embodiments covered by the claims, and to all embodiments and modifications which would be within the skill of those of ordinary skill in the art.

What is claimed is:

1. An electrospark machining system including:
   (a) an electrode forming machine comprising means for machining an electrode blank in order to produce a shaped electrode having a predetermined profile;
   (b) an electrospark machine to which said shaped electrode is adapted to be attached in order to machine a workpiece; and
   (c) a reference block having a plurality of surfaces, said reference block being adapted to be directly attached to a surface of said electrode blank and having at least one surface which serves as a common reference surface for said electrode forming machine and said electrospark machine.

2. An electrospark machining system in accordance with claim 1, said system further comprising at least one holder which is detachably connected to said electrode forming machine and at least one holder which is detachably connected to said electrospark machine, said at least one holder having mounting surfaces which are adapted to detachably engage said reference surface of said reference block in order to retain said reference block in a predetermined position within said machines.

3. An electrospark machining system in accordance with claim 2, wherein said reference block includes a parallelepipedic insertion section having three reference surfaces which are perpendicular to each other, each of said electrode forming machine holder and said electrospark machine holder comprising means for engaging said three surfaces of said insertion portion of said reference block and means for supporting said reference block in a predetermined position in said machines.

4. An electrospark machining system in accordance with claim 3, wherein each of said holders includes at least two planar surfaces which are perpendicular to each other, one of said planar surfaces being provided with two intersecting grooves and the other of said planar surfaces including at least one groove.

5. An electrospark machining system in accordance with claim 4, wherein said intersecting grooves of the forming machine holder comprise means for detachably engaging said reference block insertion portion, and said at least one groove comprises means for detachably engaging an electrode forming tool.

6. An electrospark machining system in accordance with claim 3, the system further comprising an electrode forming tool attached to a work table of said electrospark machine, said electrospark machine holder being adjustably supported on said electrode forming tool.

7. An electrospark machining system in accordance with claim 6, wherein said electrospark machine holder includes a substantially vertical guide rail which is slidably engaged by said at least one groove.

8. An electrospark machining system in accordance with claim 3, wherein each of said holders includes a shaft for respectively mounting said holders to said electrode forming machine and to said electrospark machine.

9. An electrospark machining system in accordance with claim 8, wherein said shafts are substantially cylindrical, each of said shafts including an outwardly extending, rotation restricting pin thereon.

10. An electrospark machining system in accordance with claim 2, wherein said reference block includes a reference insertion portion having three reference surfaces which are normal to each other, each of said holders including at least one reference groove which is adapted to be selectively engaged with a reference surface on said reference block to thereby comprise means for supporting said reference block in a predetermined position on said holder.

11. An electrospark machining system in accordance with claim 10, wherein each of said holders includes an integrally attached mounting shaft which comprises means for mounting the holders on said electrode forming machine and on said electrospark machine, respectively.

12. An electrospark machining system in accordance with claim 11, wherein each of said holder reference grooves is substantially perpendicular to said mounting shaft.

13. An electrospark machining system in accordance with claim 10, each of said holders including a reference surface which comprises means for mounting said holders, respectively, to said electrode forming machine and said electrospark machine.

14. An electrospark machining system in accordance with claim 13, wherein said holder reference surfaces are spaced from, and attached to, said at least one reference groove, by a connecting shaft portion.

15. An electrospark machining system in accordance with claim 2, wherein said reference block and each of said holders include a plurality of positioning holes and a plurality of positioning pins adapted to be inserted into said positioning holes in order to secure said reference block to said holders.

16. An electrospark machining system in accordance with claim 15, wherein said reference block includes said positioning holes and said holders include said positioning pins.

17. An electrospark machining system in accordance with claim 15, wherein said reference block includes said positioning pins and said holders include said positioning holes.

18. An electrospark machining system in accordance with claim 15, wherein each of said holders includes a mounting shaft integrally attached thereto which comprises a reference surface for mounting said holders to said electrode forming machine and to said electrospark machine.

19. An electrospark machining system in accordance with claim 18, wherein said holders include reference grooves which are perpendicular to said mounting shaft.

20. An electrospark machining system in accordance with claim 15, wherein each of said holders includes a mounting surface which comprises a reference surface for mounting said holders to both said electrode forming machine and to said electrospark machine.

21. An electrospark machining system in accordance with claim 1, wherein said reference block includes a reference insertion portion having three reference surfaces which are substantially normal to each other, and a blank securing portion adapted to be attached to said electrode blank, said electrode blank securing portion being normal to said reference insertion portion, said reference block thereby being substantially L-shaped.

22. An electrospark machining system in accordance with claim 1, wherein said reference block includes a reference insertion portion having three reference surfaces which are substantially normal to each other, and a blank securing portion adapted to be secured to said electrode blank, said blank securing portion lying in the same plane as said reference insertion portion, wherein said reference block is substantially I-shaped.

23. An electrospark machining system in accordance with claim 1, wherein said electrode forming machine itself comprises a wire cut electrospark machine.

24. An assembly used in a system for machining a blank into a shaped electrode capable of being used in an electrospark machining process, said assembly including a reference block having three reference surfaces which are substantially normal to each other, said reference surfaces comprising position references during the shaping of an electrode blank, said reference block being adapted to be attached to said electrode blank, said assembly further comprising a holder which is adapted to be attached to an electrode forming machine, said holder including a mounting surface for mounting and for retaining said reference block in a predetermined position.

25. An assembly in accordance with claim 24, wherein said reference block is connected to said electrode blank.

26. An assembly in accordance with claim 24, said reference block including a reference insertion portion, said reference insertion portion including three reference surfaces which are substantially normal to each other, said holder including at least one reference groove which is adapted to engage said reference surfaces, said groove thereby comprising means for retaining said reference block in said predetermined position.

27. An assembly in accordance with claim 24, wherein said electrode forming machine holder includes three reference grooves which are substantially normal to each other.

28. An assembly in accordance with claim 27, wherein two of said grooves are normal to each other within a common plane, and wherein a third of said grooves is located in a plane perpendicular to said common plane.

29. An assembly in accordance with claim 24, wherein said electrode forming machine comprises a wire cut electrospark machine, said electrode forming machine holder being adjustably attached to a work table of said wire cut electrospark machine.

30. An assembly in accordance with claim 24, wherein said reference block includes a reference insertion portion which has three reference surfaces substantially normal to each other and an electrode blank securing portion which is substantially perpendicular to the inserting portion, said reference block thereby being substantially L-shaped.

31. A system in accordance with claim 24, wherein said reference block includes a reference insertion portion having three reference surfaces substantially normal to each other and an electrode blank securing portion which is positioned in the same plane as said reference insertion portion, said reference block thereby being substantially I-shaped.

32. An assembly in accordance with claim 24, wherein said holder is attached to an electrode forming machine.

33. An assembly in accordance with claim 24, wherein said holder includes a reference groove which is substantially perpendicular to a mounting shaft on which said holder is mounted.

34. An assembly used in a system for machining a blank into a shaped electrode capable of being used in an electrospark machining process, said assembly including a reference block having three reference surfaces which are substantially normal to each other, said reference surfaces comprising position references during the shaping of an electrode blank, said reference block being adapted to be attached to said electrode blank, said assembly further comprising a holder which is adapted to be attached to an electrode forming machine, said holder including a mounting surface and a single reference groove for mounting and for retaining said reference block in a predetermined position.

35. An assembly in accordance with claim 33, wherein said holder is attached to a mounting shaft, said shaft comprising a reference for mounting said holder to said electrode forming machine.

36. An assembly in accordance with claim 34, wherein said holder is secured to a mounting support, said mounting support having a reference surface which comprises a reference for mounting said holder to said electrode forming machine.

37. An assembly in accordance with claim 36, wherein said reference block includes a reference insertion portion which has three reference surfaces substantially normal to each other, and an electrode blank securing portion which is substantially perpendicular to the inserting portion, said reference block being thereby substantially L-shaped.

38. An assembly in accordance with claim 34, wherein said reference block includes a reference insertion portion having three reference surfaces substantially normal to each other and an electrode blank securing portion which is positioned in the same plane as said reference insertion portion, said reference block thereby being substantially I-shaped.

39. An assembly in accordance with claim 35, wherein said holder reference groove is substantially perpendicular to said mounting shaft.

40. An assembly used in a system for machining a blank into a shaped electrode capable of being used in an electrospark machining process, said assembly including a reference block having three reference surfaces which are substantially normal to each other, said reference surfaces comprising position references during the shaping of an electrode blank, said reference block being adapted to be attached to said electrode blank, said assembly further comprising a holder which is adapted to be attached to an electrode forming machine, said holder including a mounting surface for mounting and for retaining said reference block in a predetermined position, said holder also including two planar surfaces, substantially normal to each other, one of said planar surfaces including two reference grooves which intersect each other, and the other of said planar surfaces including a single reference groove.

41. An assembly in accordance with claim 40, wherein said holder includes a mounting shaft which comprises a reference surface for mounting said reference block to said electrode forming machine.

42. An assembly in accordance with claim 40, wherein said holder includes a mounting surface for mounting said reference block to said electrode forming machine.

43. An electrospark machining system including:
(a) an electrode forming machine comprising means for machining an electrode blank in order to produce a shaped electrode having a predetermined profile;
(b) an electrospark machine to which said shaped electrode is adapted to be attached in order to machine a workpiece; and
(c) a reference block having a reference insertion portion with three reference surfaces which are substantially normal to each other and a blank securing portion adapted to be attached to said electrode blank, said electrode blank securing portion being normal to said reference insertion portion, said reference block thereby being substantially L-shaped, and whereby at least one surface serves as a common reference surface for said electrode forming machine and said electrospark machine.

44. An electrospark machining system including:
(a) an electrode forming machine comprising means for machining an electrode blank in order to produce a shaped electrode having a predetermined profile;
(b) an electrospark machine to which said shaped electrode is adapted to be attached in order to machine a workpiece; and
(c) a reference block having a reference insertion portion with three reference surfaces which are substantially normal to each other and a blank securing portion adapted to be secured to said electrode blank, said blank securing portion lying in the same plane as said reference insertion portion, wherein said reference block is substantially I-shaped, and whereby at least one surface serves as a common reference surface for said electrode forming machine and said electrospark machine.

45. A mounting device for an electrode to be used in an electrospark machine, said mounting device comprising:
(a) an electrode holder which is adapted to support an electrode blank to be machined3;
(b) a machine holder which is adapted to be detachably mounted, both to an electrode forming machine for machining said electrode blank into a shaped blank having a desired shape and to an electrospark machine which is adapted to use said shaped electrode to machine a workpiece, wherein said electrode holder and said machine holder include inclined surfaces which are inclined at a substantially 45° angle with respect to an axis of said machine holder, wherein said holders are adapted to engage each other along said inclined surfaces, said inclined surfaces being moveable with respect to each other and thereby comprising means for changing the direction in which said electrode blank extends.

46. A mounting device in accordance with claim 45, wherein said inclined surfaces are rotatable with respect to each other and comprise means for changing said direction in which said electrode blank extends by 90° when they are rotated over 180° with respect to each other.

47. A mounting device in accordance with claim 46, wherein said electrode holder and said machine holder are detachably connected to each other.

48. A mounting device in accordance with claim 45, wherein said inclined surfaces comprise electrode-direction changing, rotational surfaces which are adapted to rotate about an axis inclined at an angle of substantially 45° with respect to the axis of said machine holder.

49. A mounting device in accordance with claim 48, wherein said inclined surfaces have central holes, along their respective axes of rotation, into which a central pin is adapted to be inserted in order to define a common axis about which relative rotation of said holders will occur, said central pin including a central bore into which a fastening bolt is adapted to be inserted in order to secure said holders to each other.

50. A mounting device in accordance with claim 48, wherein at least one of said machine holder and said electrode holder is provided with a positioning plate which is adapted to project towards the holder to which said plate is not attached, the other of said holders being provided with a pair of parallel position restricting surfaces which are adapted to engage said positioning plate when said electrode holder and said machine holder are angularly displaced, from a first position by 180° with respect to each other.

51. A mounting device in accordance with claim 45, further comprising a positioning pin positioned between said electrode holder and said machine holder, which pin comprises means for selectively restricting angular movement between said holders.

52. A mounting device in accordance with claim 45, wherein said machine holder and said electrode holder include at least one position restricting projection and at least one position restricting recess adapted to receive said projection in fitting engagement, said projection and said recess being positioned on said inclined surfaces such that they intersect an axis of said machine holder.

53. A mounting device in accordance with claim 52, wherein said position restricting projection and said position restricting recess are rectangularly shaped in cross-section.

54. A mounting device in accordance with claim 52, wherein said position restricting projection and said position restricting recess have complementary V-shaped cross-sections.

55. A mounting device in accordance with claim 54, wherein one of said holders includes a positioning plate which projects towards the other of said holders, the other of said holders including a pair of parallel position restricting surfaces which are adapted to engage said positioning plate, dependent upon the relative rotational positions of said two holders.

56. A mounting device in accordance with claim 45, wherein one of said inclined surfaces includes two spaced apart bores and the other of said inclined surfaces includes a single bore, wherein said single bore is adapted to be selectively aligned with each of said spaced apart bores in predetermined positions of said holders, and wherein a fastening member is adapted to be inserted into said aligned bores.

57. A mounting device for an electrode used in an electrospark machine, said mounting device including an electrode holder which is adapted to support a blank of an electrode to be machined, and a machine holder which is adapted to be attached both to an electrode forming machine which is adapted to machine the blank into a shaped electrode having a predetermined shape and to an electrospark machine which is adapted to use said shaped electrode to machine a workpiece, said electrode holder and said machine holder including surfaces which are inclined at 45° with respect to the axis of said machine holder and which are adapted to engage each other, said inclined surfaces comprising means for changing the position of said electrode blank by approximately 90° when said surfaces are repositioned with respect to each other over approximately 180°, wherein one of said holders is provided with a positioning plate which is adapted to be selectively projected towards and retracted from the other of said holders, wherein the other of said holders includes a pair of parallel position restricting surfaces which are adapted to engage said positioning plate when it is projected towards said other holder.

58. A mounting device in accordance with either of claims 45 or 57, wherein said electrode holder includes a pair of electrode securing surfaces which are perpendicular to each other and which are angled at substantially 45° with respect to the inclined surface of said electrode holder.

59. A mounting device in accordance with claim 58, wherein said electrode securing surfaces of said electrode holder include a plurality of threaded holes which are adapted to threadably receive a plurality of fastening bolts.

60. A mounting device in accordance with claim 57, wherein said inclined surfaces rotatably engage each other and are rotatably repositioned with respect to each other.

61. A method of shaping a workpiece in a predetermined configuration by using an electrospark machining electrode, said method comprising:
 (a) directly mounting an electrode blank to be shaped onto a block having a reference surface;
 (b) attaching said block reference surface to an electrode forming machine;
 (c) shaping said blank into a shaped electrode of a predetermined shape by using said electrode forming machine;
 (d) detaching said block and blank from said electrode forming machine and attaching said block reference surface to an electrospark machine; and
 (e) shaping a workpiece by using said electrospark machine to which said shaped electrode has been attached.

62. A method in accordance with claim 61, further comprising attaching said block reference surface to a holder on said electrode forming machine and to a holder on said electrospark machine.

63. A method in accordance with claim 62, wherein said reference surface is attached in the same positional relationship to each of said holders.

64. A holder which is adapted to be detachably connected to both an electrode forming machine and to an electrospark machine, said holder comprising a substantially parallelepipedic block, said block comprising four side surfaces, an upper surface, and a lower surface, wherein four corner projections extend upwardly from said upper surface, each of said corner projections being spaced from two adjacent corner projections, wherein a plurality of substantially perpendicular grooves are formed between said spaced corner projections, one of said side surfaces including a channel which is adapted to be attached to an electrode forming machine.

65. A holder in accordance with claim 64, further comprising at least one position limiting member attached to a side wall of said reference block and extending upwardly beyond said upper surface of said block.

66. A reference block in accordance with claim 65, wherein each of said grooves comprises means for detachably receiving a portion of a reference block to which an electrode blank to be shaped is attached.

67. An assembly comprising an electrode blank to be shaped and a reference block which is adapted to be attached to said electrode blank, said assembly being adapted to be attached to either an electrode forming machine or to an electrospark machine, said block having a plurality of bores which are adapted to be aligned with corresponding bores on one surface of said electrode blank, and fastening means adapted to be inserted into said respective bores to directly connect said reference block to said surface of said electrode blank.

68. An assembly in accordance with claim 67, wherein said reference block is substantially parallelepipedic.

69. An assembly in accordance with claim 67, wherein said reference block is substantially L-shaped.

70. An assembly in accordance with claim 67, wherein said electrode blank is substantially cylindrical and said reference block comprises a hollow tube which includes an opening which is adapted to receive one end of said electrode blank.

71. An assembly in accordance with claim 67, wherein said reference block is substantially parallelepipedic and includes a central circular opening which comprises means for receiving a projection on a holder which is adapted to be connected to both an electrode forming machine and to an electrospark machine.

72. An assembly in accordance with claim 67, further comprising a holder adapted to detachably engage said assembly, said holder including means for releasably engaging a reference surface of said reference block.

73. An assembly in accordance with claim 72, wherein said holder comprises a plurality of intersecting grooves for releasably engaging said reference block.

74. An assembly in accordance with claim 72, wherein said holder comprises only a single groove for releasably engaging said block.

75. An assembly in accordance with claim 72, wherein said holder and said reference block include a plurality of aligned bores, said assembly further comprising a plurality of fastening elements inserted into said bores to attach said holder to said block.

76. An assembly in accordance with claim 72, further comprising a shaft attached to said holder.

77. An assembly in accordance with claim 72, further comprising a mounting member with a reference surface which is attached to said holder.

78. An assembly in accordance with claim 67, wherein said electrode blank is substantially parallelepipedic.

79. An assembly used in a system for machining a blank into a shaped electrode capable of being used in an electrospark machining process, said assembly including a reference block having three reference surfaces which are substantially normal to each other, said reference surfaces comprising position references during the shaping of an electrode blank, said reference block being adapted to be attached to said electrode blank, said assembly further comprising a holder which is adapted to be attached to an electrode forming machine, said holder including a mounting surface for mounting and for retaining said reference block in a predetermined position, said reference block and said holder including a plurality of cooperating positioning holes and pins which are adapted to attach said reference block to said holder.

80. An assembly used in a system for machining a blank into a shaped electrode capable of being used in an electrospark machining process, said assembly including a reference block having three reference surfaces which are substantially normal to each other, said references surfaces comprising position references during the shaping of an electrode blank, said reference block being adapted to be attached to said electrode blank, said assembly further comprising a holder which is adapted to be attached to an electrode forming machine, said holder including a mounting surface for mounting and for retaining said reference block in a predetermined position, said holder being attached to a mounting member having a reference surface which comprises a reference for mounting said holder to said electrode forming machine.

81. An assembly comprising an electrode blank to be shaped and a reference block which is adapted to be attached to said electrode blank, said assembly being adapted to be attached to either an electrode forming machine or to an electrospark machine, said block having a plurality of bores which are adapted to be aligned with corresponding bores on one surface of said electrode blank, and fastening means adapted to be inserted into said respective bores to connect said reference block to said electrode blank, said electrode blank being substantially cylindrical and said reference block comprises a hollow tube which includes an opening which is adapted to receive one end of said electrode blank.

82. An assembly comprising an electrode blank to be shaped and a reference block which is adapted to be attached to said electrode blank, said assembly being adapted to be attached to either an electrode forming machine or to an electrospark machine, said block having a plurality of bores which are adapted to be aligned with corresponding bores on one surface of said electrode blank, fastening means adapted to be inserted into said respective bores to connect said reference block to said electrode blank, and a holder adapted to detachably engage said assembly, said holder including means for releasably engaging a reference surface of said reference block.

* * * * *

UNITED STATES PATENT AND TRADEMARK OFFICE
CERTIFICATE OF CORRECTION

PATENT NO. : 4,859,824
DATED : August 22, 1989
INVENTOR(S) : Shiroh UKAJI, et al.

It is certified that error appears in the above-identified patent and that said Letters Patent is hereby corrected as shown below:

At column 2, line 20, change "electrode spark" to ---electrospark---.

At column 5, line 26, change "includes" to ---include---.

At column 13, line 56, change "of the" to ---as---.
At column 18, line 65, change "FIG" to ---FIGS---.
At column 22, line 35, change "claim 33" to ---claim 34---.

At column 22, line 44, change "claim 36" to ---claim 34---.

At column 22, line 58, change "claim 35" to ---claim 34---.

At column 23, line 59, change "machined3" to ---machined---.

Signed and Sealed this

Sixth Day of August, 1991

*Attest:*

HARRY F. MANBECK, JR.

*Attesting Officer*    *Commissioner of Patents and Trademarks*